United States Patent Office 3,386,798
Patented June 4, 1968

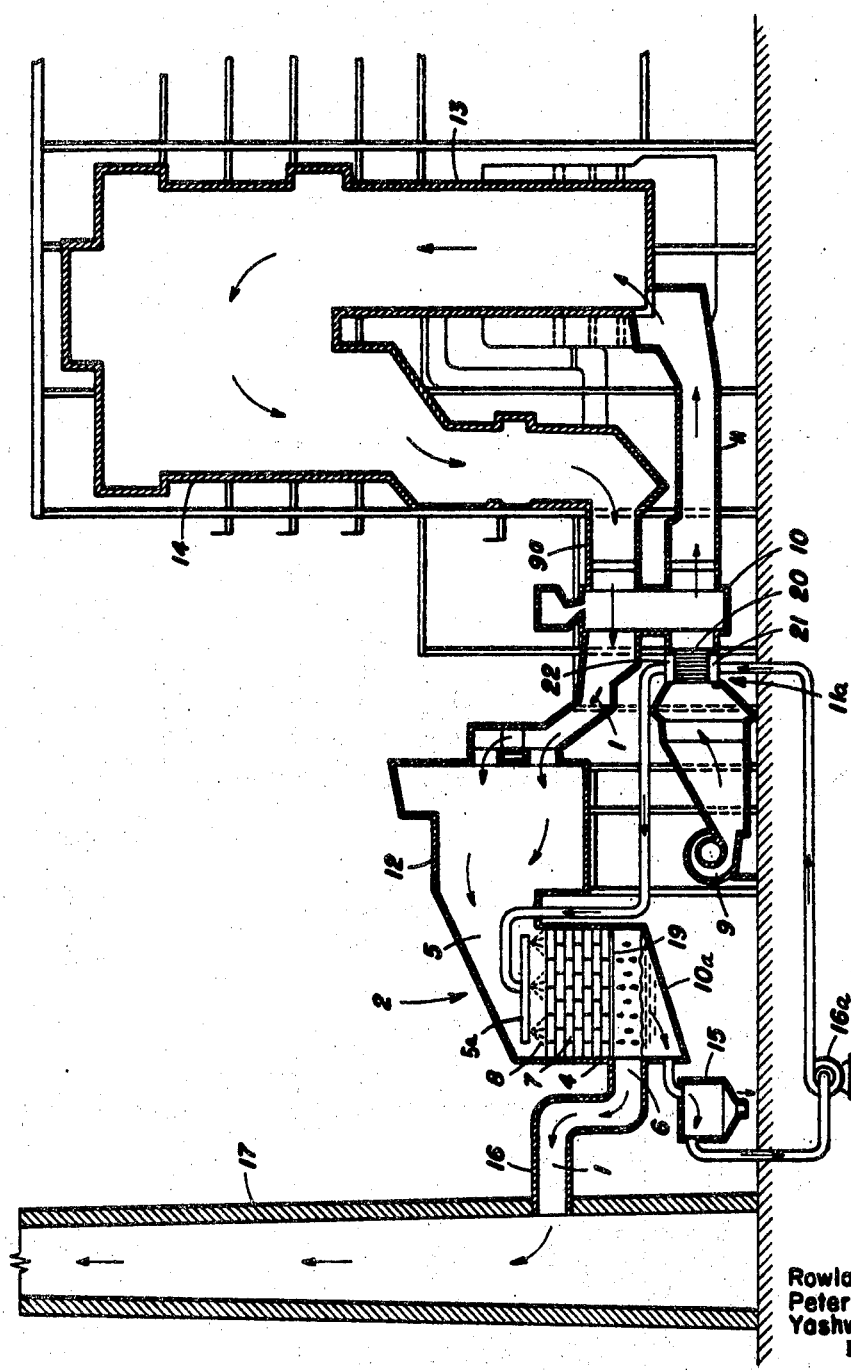

3,386,798
METHOD OF REMOVING SULFUR COMPOUNDS AND RECOVERING HEAT FROM COMBUSTION GASES
Rowland S. Bevans, Morristown, Peter N. Renzi, Mountainside, and Yashwant R. Loonkar, Hoboken, N.J., assignors to American Standard Inc., a corporation of Delaware
Filed Nov. 30, 1964, Ser. No. 414,759
5 Claims. (Cl. 23—2)

ABSTRACT OF THE DISCLOSURE

Method of removing sulfur compounds and recovering heat from combustion chamber stack gases comprising washing the gases with a solution of calcium chloride, neutralizing the resultant hydrochloric, separating the thus formed calcium sulfur salts from the solution and thereafter passing the solution into indirect heat exchange with air to be used in the combustion chamber.

---

The present invention relates to an improved method for treating stack gases from a power plant and more particularly to an improved method of recovering heat from stack gases and of removing the sulphurous products of combustion from the stack gases.

Steam generating equipment is used to convert water into steam (usually into superheated steam) and comprises a boiler in which coal, oil, gas or some other suitable substance is burned in the presence of air (which is preferably pre-heated) to provide the heat necessary for boiling water into steam. The waste gases of combustion, which are usually called stack gases, must then be exhausted to the atmosphere. For greater economy and efficiency, it is desirable to remove or recover as much heat as possible from the stack gases before they are discarded and to use the heat recovered from the stack gases to help in preheating the combustion air used in the combustion chamber since pre-heating of the air will result in a saving in fuel.

In power plant operation, it is conventional to recover heat from stack gases and to use this heat to preheat the combustion air. The usual devices for accomplishing this heat recovery are called air preheaters wherein the stack gas heat is transferred to a solid metal surface from which it is then transferred to the air either regeneratively or by continuous contact of the air on the opposite side of the solid surface. The amount of heat that can be recovered from the stack gas by these air preheaters is limited by the temperature at which liquid starts to condense from the stack gas. When this liquid, which is usually concentrated sulfuric acid but for some fuels and conditions may be mostly water, condenses on the metal surface of the air preheater, it causes such severe corrosion and fouling problems that most air preheaters will soon cease to function under such conditions. For this reason, it is common practice to maintain the stack gases leaving air preheaters above the temperature at which condensation might begin, which is usually about 250 degrees Fahrenheit for coal-fired boilers, and to waste the residual heat in these gases represented by this temperature.

A few special surface heat exchangers have been designed to cope with the condensation problem and recover additional low temperature level heat from the stack gas. These devices are generally known as low level economizers and have been so heavy and expensive that they have not been generally accepted.

Another approach to low level economizers that has been suggested is a direct contact heat exchanger where a heat transfer liquid is heated by direct contact with the stack gases in a so-called gas scrubber. The liquid heated in this manner is then used to preheat the combustion air. The problems associated with condensation are eliminated in such a device since any liquid or solid matter from the stack gas is simply washed away with the heat transfer liquid. The usual liquid in a gas scrubber is water. Water has a relatively high vapor pressure so that the temperature to which it can be heated in a gas scrubber type of low level economizer is severely limited by its tendency to evaporate. For stack gas from a coal fired boiler, the upper temperature to which water can effectively be heated is about 115 degrees Farenheit. This is too low to be of much use in preheating combustion air. Furthermore, water would be of very limited effectiveness in removing sulfur products from the stack gas.

The present invention contemplates the use as a low level economizer of a gas scrubber which removes the aforesaid disadvantages, in that it uses a liquid scrubbing agent which has a low vapor pressure and can be heated to substantially greater temperatures by stack gases without evaporating.

In addition, the present invention also provides an improved method of recovering the sulphurous products of combustion normally found in stack gases.

Accordingly, it is an object of the present invention to provide a method of treating stack gases which improves the efficiency and economy of steam generating equipment.

Another object of the present invention is the provision of an improved method of recovering greater quantities of heat from stack gases than is presently practical using conventional heat recovery devices.

Another object of the present invention is to provide a liquid scrubbing agent which has an improved performance over other known liquids.

A further object of the present invention is to provide a method of removing sulphur dioxide and sulphuric acid vapor from the stack gases by chemical treatment of the liquid scrubber solution.

Another object of the present invention is to provide for the treatment of stack gases to make them less of an air pollution problem than heretofore.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein:

The drawing is a schematic view illustrating a gas scrubber system made in accordance with the present invention.

Referring to the drawing air is injected by the forced draft fan 9 via duct 11 into the combustion chamber 13 of a boiler 14 where it mixes with a suitable fuel which burns to fire the boiler. The resulting hot exhaust or stack gases 1 flow from the boiler 14 via the duct 9a through the usual air preheater 10 and dust collector 12 to a gas scrubber operating as a low level economizer generally indicated by the reference number 2. The economizer 2 comprises and outer shell 4 having inlet and outlet openings 5 and 6, respectively, to permit the free flow of stack gases through its interior. The gases enter from inlet 5 and leave through outlet 6 and are ejected via the duct 16 to a stack 17.

A scrubbing fluid 8 is sprayed on the stack gases 1 in the low level economizer 2 so that some of the heat of the stack gases will be transferred to the scrubbing fluid.

The interior of the shell 4 has a heat transfer packing 7 which will facilitate the transfer of heat to the fluid 8. The packing may be suitably supported in the shell 4 such as by the support grid 19. The packing 7 may be made of any suitable structural material, such as metal, ceramic material, paper, etc., arranged in a manner to produce a large surface area for gas-liquid contact. Preferably, the packing 7 is made of layers of a honeycomb pattern according to co-pending United States patent application Ser. No. 255,925 of Peter N. Renzi, filed Nov. 27, 1963, now Patent No. 3,227,380, which is owned by the assignee of the present invention. A packing of the kind described in said patent application offers several advantages including low resistance to gas flow, good heat transfer, a large surface area, freedom from fouling and low cost.

After the exhaust gases and the scrubbing liquid pass through the packing section 7, the liquid collects in a sump tank 10a and the stack gases are ejected from the system through the stack 17. The liquid, which now is at a higher temperature, is directed to a heat-exchange mechanism 11a through settling tank 15 and pump 16a. Any heavy material in the liquid will be removed in the settling tank 15. The heat-exchange mechanism 11a may comprise heat-exchange tubes 20 disposed within the path of combustion air passing through the duct 11 and carrying the scrubbing liquid between inlet and outlet headers 21 and 22, respectively.

The heat-exchange mechanism 11a is adapted to preheat the combustion air and transfers some of the heat of the liquid to the air in order to help in pre-heating the combustion air before the air is injected into the combustion chamber 13. The cooled liquid is then recirculated and ejected into the packing section 7.

It has been found that by using a liquid having a low vapor pressure, heat can be recovered from the stack gases at higher, more usable temperature levels because the liquid can be heated to higher temperatures before the liquid begins to evaporate.

Although any suitable liquid having a vapor pressure lower than water may be used as the liquid scrubbing agent, it is preferable to use a salt solution, such as an aqueous calcium chloride solution. Salt solution, such as calcium chloride solutions, have substantially lower vapor pressures than plain water and hence can be heated to higher temperatures before reaching the same evaporating tendencies. A calcium chloride solution, therefore, can recover heat from the stack gases at higher temperature levels than is possible with ordinary water since water begins to evaporate in the temperature range from about 100 to about 115 degrees Farenheit in the presence of stack gases from coal-fired boilers.

In addition to having a higher evaporation temperature, the calcium chloride solution is inexpensive, non-toxic to operating personnel and non-corrosive to plant machinery. It has been found that a 35% to 45% aqueous calcium chloride solution gives excellent results for heat recovery.

Ordinarily, some sulphur dioxide and sulphuric acid vapor are present in the stack gases as a result of the burning process. Both sulphuric acid vapor and sulphur dioxide cause air pollution, and in addition, sulphuric acid vapor is highly corrosive to the system.

In accordance with the present invention, sulphuric acid vapor and sulphur dioxide are removed from the stack gases by reacting with the calcium chloride solution to form calcium sulphate, calcium sulphite, and hydrochloric acid according to the following formulas:

$$CaCl_2 + H_2SO_4 \rightarrow CaSO_4 + 2HCl$$
$$CaCl_2 + SO_2 + H_2O \rightarrow CaSO_3 + 2HCl$$

The calcium sulphate and calcium sulphite formed have very low solubilities in water, and when the scrubber solution is transferred from the sump tank 10 to a settling tank 15 they separate from the solution and collect at the bottom of the settling tank 15 from which they are removed in the form of a slurry.

The slurry is a mixture of calcium chloride solution, calcium sulphate, calcium sulphite, fly ash and soot removed from the stack gases in the economizer. The amount of calcium chloride lost with the slurry is kept at a minimum and any amount lost with the slurry may be replaced by a fresh supply of solution to the system. (If desired, the calcium chloride solution removed with the slurry may be recovered from the removed slurry through filtration or decantation and returned to the system.) In this manner, the sulphurous products of combustion are effectively removed from the stack gases as innocuous calcium compounds.

It will be noted that hydrochloric acid is a by-product of the chemical reaction between the sulphur products and the calcium chloride solution. Since hydrochloric acid is highly corrosive it must be removed from the system. This is done by adding a suitable neutralizer, such as calcium hydroxide, which reacts with the hydrochloric acid and forms calcium chloride and water in accordance with the following formula:

$$Ca(OH)_2 + 2HCl \rightarrow CaCl_2 + 2H_2O$$

The calcium chloride and water formed go into solution thereby not only neutralizing the corrosive hydrochloric acid, but also regenerating the aqueous calcium chloride solution.

Preferably, enough calcium hydroxide is added to neutralize the hydrochloric acid and to give the aqueous solution a slightly basic character.

An example of the present invention utilizes a packing having the following dimensions:

| | |
|---|---|
| Volume | 167 Cubic feet. |
| Frontal area | 500 Square feet. |
| Height | 1/3 foot. |
| Form | 3/8" thick layers of honeycomb-like structure with 3/8" across individual hexagonal passages. |
| Material | Resin - impregnated kraft paper. |
| Pressure drop of the stack gases | .70 inch of water. |
| Heat transfer | $54 \times 10^6$ of B.t.u.'s per hour. |

Stack gases 1 at about 250 degrees Fahrenheit and at a flow rate of $2.8 \times 10^3$ pounds per hour flow into the economizer 2 for scrubbing and are cooled by the calcium chloride solution 8 being sprayed from header 5a to about 180° F.

The calcium chloride solution 8 contains about 40 to 42½% calcium chloride and enters the economizer 2 at about 90° F. The flow rate of the calcium chloride solution is about $1.6 \times 10^6$ pounds per hour. On leaving the economizer 2 the calcium chloride solution is at a temperature of 142° F. with no loss of solution through evaporation and it flows into the settling tank 15 where the solids, such as calcium sulphate, calcium sulphite and fly ash, plus some calcium chloride solution, are removed as a slurry.

Approximately 50 pounds per hour of calcium hydroxide are added to the settling tank 15 to neutralize the hydrochloric acid which at the same time regenerates the calcium chloride solution.

The calcium chloride solution at a slightly reduced temperature of about 140° F. is pumped from the settling tank 15 to a liquid-to-air heat exchanger 11a where the heated calcium chloride solution transfers its heat to the combustion air to pre-heat the combustion air.

The liquid-to-air heat exchanger may have a surface area of about 206,000 square feet, (based on a heat transmittance of 10 B.t.u. per sq. ft. —° F.-hour) and the heat transfer is about $51.5 \times 10^6$ B.t.u.'s per hour. In this type of heat exchanger about $2.55 \times 10^3$ pounds per hour of air are heated from an average temperature of about 45° F. to about 130° F. The calcium chloride solution in its cool condition then leaves the heat exchanger and returns to the economizer 2 for a repetition of the cycle.

Approximately 200 pounds per hour of the calcium chloride solution are replaced in the system to compensate for losses resulting from the removal of slurry from the settling tank.

It will be seen that applicant has provided an improved economizer for recovering heat from stack gases at higher temperature levels. In addition, the sulphurous products of combustions are removed from the stack gases by the present invention. The result is a simple and effective way of eliminating the corrosive sulphuric acid from the scrubber solution and preventing their escape to and the pollution of the atmosphere. Moreover, the new chemical treatment regenerates the scrubber solution and this substantially reduces the corrosiveness of the solution which otherwise would become strongly acidic as well as reducing the requirement for make-up calcium chloride solution.

As various changes may be made in the form, construction and arrangement of the parts herein without departing from the spirit and scope of the invention and without sacrificing any of its advantages, it is to be understood that all matter herein is to be interpreted as illustrative and not in a limiting sense. For example, in the drawing, the stack gas flows down through the packing in the same direction as the liquid. In some circumstances, it may be desirable for the stack gas to flow up through the packing countercurrent to the liquid flow.

What is claimed is:

1. The method of treating hot stack gases issuing from a combustion chamber and containing sulfurous materials which comprises the steps of:
   (i) washing said hot stack gases with an aqueous solution of calcium chloride to absorb heat from said gases into said solution and to react the sulfurous materials in said stack gases with said calcium chloride to form an aqueous mixture of sulfurous calcium salts and hydrochloric acid,
   (ii) adding calcium hydroxide to said mixture to neutralize the hydrochloric acid and regenerate the calcium chloride solution,
   (iii) separating the sulfurous calcium salts from the calcium chloride solution and
   (iv) thereafter flowing the heated calcium chloride solution in heat exchange relationship with air to be consumed in the combustion chamber, thereby heating said air before it enters said combustion chamber.

2. The method of claim 1 which includes the added step of washing further quantities of hot stack gases with the calcium chloride solution used to heat the air consumed in the combustion chamber.

3. The method of claim 1 wherein calcium hydroxide is added in sufficient quantity to said aqueous mixture to give the mixture a slightly basic character.

4. The method of treating hot stack gases issuing from a combustion chamber and containing sulfurous materials and dust particles which comprises the steps of:
   (i) washing the hot stack gases with an aqueous solution of calcium chloride to remove said dust particles from said gases and to absorb heat from said gases into said solution and to react the sulfurous material in said gases with said calcium chloride to form an acid and sulfurous calcium salts in said solution,
   (ii) adding calcium hydroxide to the solution to neutralize the acid formed by the reaction of calcium chloride with the sulfurous materials,
   (iii) allowing the dust particles and sulfurous calcium salts in the solution to settle,
   (iv) separating said dust particles and sulfurous calcium salts from the heated solution and
   (v) thereafter flowing the clarified heated solution in heat exchange relationship with air to be consumed in the combustion chamber, thereby heating said air before it enters said combustion chamber.

5. The method of claim 4 which includes the added step of washing further quantities of hot stack gases with the clarified calcium chloride solution used to heat the air consumed in the combustion chamber.

References Cited
UNITED STATES PATENTS

| | | | |
|---|---|---|---|
| 1,091,689 | 3/1914 | Moore et al. | 23—178 |
| 2,165,784 | 7/1939 | Burrage | 23—154 |

OSCAR R. VERTIZ, *Primary Examiner.*

EARL C. THOMAS, *Examiner.*